United States Patent
Paek et al.

(10) Patent No.: US 9,621,214 B2
(45) Date of Patent: Apr. 11, 2017

(54) PROTECTIVE SHROUD FOR HANDHELD DEVICE

(75) Inventors: Timothy S. Paek, Sammamish, WA (US); Eric Norman Badger, Issaquah, WA (US); Daniel Allen Rosenfeld, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 606 days.

(21) Appl. No.: 13/540,558

(22) Filed: Jul. 2, 2012

(65) Prior Publication Data
US 2012/0270607 A1  Oct. 25, 2012

Related U.S. Application Data

(63) Continuation of application No. 12/394,852, filed on Feb. 27, 2009, now Pat. No. 8,229,509.

(51) Int. Cl.
*H04B 1/38* (2015.01)
*H04B 1/3888* (2015.01)
(Continued)

(52) U.S. Cl.
CPC ......... *H04B 1/3888* (2013.01); *G06F 1/1616* (2013.01); *G06F 1/1652* (2013.01);
(Continued)

(58) Field of Classification Search
USPC ...... 455/566, 572, 550.1, 575.3, 575.8, 156, 455/168, 175
See application file for complete search history.

(56) References Cited

U.S. PATENT DOCUMENTS

| 6,168,331 B1 | 1/2001 | Vann |
| 6,456,487 B1 | 9/2002 | Hetterick |

(Continued)

FOREIGN PATENT DOCUMENTS

| CN | 2602549 Y | 2/2004 |
| CN | 1527569 A | 9/2004 |

(Continued)

OTHER PUBLICATIONS

Int. Preliminary Report on Patentability cited in PCT Application No. PCT/US2010/023259 dated Aug. 30, 2011, 5 pgs.
(Continued)

*Primary Examiner* — Vibol Tan
(74) *Attorney, Agent, or Firm* — Klarquist Sparkman, LLP

(57) ABSTRACT

An apparatus for communicating with a handheld device (e.g., a cellular telephone) is provided herein. A protective shroud is configured to enclose the handheld device and protect it against incidents that commonly cause damage to handheld devices. Integral to the protective shroud is at least one of an input component configured to receive user input and a wireless transceiver configured to transmit signals to and/or receive signals from the handheld device. In one example, where both the input component and the wireless transceiver are integral to the protective shroud, signals related to received user input (e.g., where the shroud serves as a keypad) may be transmitted to the handheld device even if the protective shroud is removed from the handheld device.

22 Claims, 4 Drawing Sheets

(51) Int. Cl.
*G06F 1/16* (2006.01)
*H04M 1/04* (2006.01)
*H04M 1/725* (2006.01)

(52) U.S. Cl.
CPC ........... *H04M 1/04* (2013.01); *H04M 1/7253* (2013.01); *H04M 2250/18* (2013.01)

(56) References Cited

U.S. PATENT DOCUMENTS

| | | | |
|---|---|---|---|
| 6,477,274 | B1 | 11/2002 | Kim et al. |
| 6,480,377 | B2 | 11/2002 | Genest et al. |
| 6,671,170 | B2 | 12/2003 | Webb et al. |
| 6,693,626 | B1* | 2/2004 | Rosenberg .................... 345/168 |
| 6,976,799 | B2 | 12/2005 | Kim et al. |
| 7,002,553 | B2 | 2/2006 | Shkolnikov |
| 7,102,614 | B2 | 9/2006 | Sandbach et al. |
| 7,203,467 | B2 | 4/2007 | Siddiqui |
| 7,286,860 | B2 | 10/2007 | Harris |
| 7,289,083 | B1 | 10/2007 | Canova, Jr. |
| 7,327,255 | B2 | 2/2008 | Kassiedass |
| 7,479,902 | B2 | 1/2009 | Wang et al. |
| 7,535,459 | B2 | 5/2009 | You et al. |
| 7,612,997 | B1 | 11/2009 | Diebel et al. |
| 8,522,965 | B1 | 9/2013 | Hsiung |
| 2001/0011995 | A1 | 8/2001 | Hinkley et al. |
| 2002/0039922 | A1 | 4/2002 | Nelson |
| 2003/0025674 | A1 | 2/2003 | Watanabe |
| 2003/0027517 | A1 | 2/2003 | Callway |
| 2003/0100338 | A1* | 5/2003 | Lee ............................... 455/556 |
| 2003/0186746 | A1 | 10/2003 | Chuang |
| 2004/0097256 | A1* | 5/2004 | Kujawski .................... 455/550.1 |
| 2004/0136149 | A1 | 7/2004 | Wang et al. |
| 2004/0178989 | A1 | 9/2004 | Shahoian et al. |
| 2004/0203486 | A1 | 10/2004 | Shepherd et al. |
| 2005/0125083 | A1 | 6/2005 | Kiko |
| 2006/0003709 | A1* | 1/2006 | Wood ................... H04B 1/3888 445/90.3 |
| 2006/0279924 | A1 | 12/2006 | Richardson et al. |
| 2007/0008118 | A1 | 1/2007 | Kassiedass |
| 2007/0097014 | A1* | 5/2007 | Solomon ............... G06F 1/1616 345/1.1 |
| 2007/0173197 | A1 | 7/2007 | Hsuing |
| 2008/0063456 | A1 | 3/2008 | Lahr |
| 2008/0096620 | A1 | 4/2008 | Lee et al. |
| 2008/0123287 | A1 | 5/2008 | Rossell et al. |
| 2008/0136716 | A1 | 6/2008 | Annamaa et al. |
| 2008/0146206 | A1 | 6/2008 | Pichardo et al. |
| 2008/0225006 | A1 | 9/2008 | Ennadi |
| 2008/0246731 | A1* | 10/2008 | Chechelniker ................ 345/168 |
| 2008/0263363 | A1 | 10/2008 | Jueneman et al. |
| 2008/0300013 | A1 | 12/2008 | Raines et al. |
| 2009/0027346 | A1 | 1/2009 | Srivastava et al. |
| 2009/0120980 | A1 | 5/2009 | Calayo |
| 2009/0124308 | A1 | 5/2009 | Lee |
| 2010/0039764 | A1* | 2/2010 | Locker et al. ........... 361/679.29 |
| 2010/0079379 | A1* | 4/2010 | Demuynck et al. .......... 345/169 |
| 2011/0222109 | A1 | 9/2011 | Yamagishi |

FOREIGN PATENT DOCUMENTS

| | | |
|---|---|---|
| CN | 201114710 Y | 9/2008 |
| CN | 201114710 Y | 9/2008 |
| CN | 201185725 Y | 1/2009 |
| EP | 0852356 | 7/1998 |
| JP | 1130245 | 9/1989 |
| JP | 06-301447 | 10/1994 |
| JP | H11146049 | 5/1999 |
| JP | 2000253122 | 9/2000 |
| JP | 2001-100892 | 4/2001 |
| JP | 2001130245 A | 5/2001 |
| JP | 2001147745 A | 5/2001 |
| JP | 2001-154990 | 6/2001 |
| JP | 2001154990 A | 6/2001 |
| JP | 2002-0149312 | 5/2002 |
| JP | 2002-287862 | 10/2002 |
| JP | 2002-366284 | 12/2002 |
| JP | 2003-058278 | 2/2003 |
| JP | 2003-290553 | 10/2003 |
| JP | 2004-180093 | 6/2004 |
| JP | 2004-336140 | 11/2004 |
| JP | 2005079607 | 3/2005 |
| JP | 2006502471 | 1/2006 |
| JP | 2006301447 A | 11/2006 |
| JP | 2008-022191 | 1/2008 |
| JP | 2008096620 A | 4/2008 |
| JP | 2009267490 | 11/2009 |
| KR | 1020070001529 | 1/2007 |
| KR | 1020080094779 | 10/2008 |
| KR | 1020010100312 | 11/2008 |
| WO | WO 97/49040 | 12/1997 |
| WO | 01/75572 A3 | 4/2002 |

OTHER PUBLICATIONS

Reply second Chinese Office Action cited in Chinese Application No. 201080009733.1 dated Oct. 26, 2012, 4 pgs.

Third Chinese Office Action cited in Chinese Application No. 201080009733.01 dated Nov. 5, 2012, 8 pgs.

Reply Third Chinese Office Action cited in Chinese Application No. 201080009733.01 dated Jan. 6, 2013, 2 pgs.

Final Chinese Office Action cited in Chinese Application No. 201080009733.01 dated Apr. 7, 2013, 8 pgs.

EP Search Report cited in EP Application No. 10746620.3 dated Jun. 13, 2012, 2 pgs.

EP Communication cited in EP Application No. 10746620.3 dated Jul. 12, 2012, 1 pg.

Reply EP Communication cited in EP Application No. 10746620.3 dated Nov. 15, 2012, 7 pgs.

Japanese Office action cited in Japanese Application No. 2011-552061 dated Jun. 25, 2013, 8 pgs.

Japanese Office Action cited in Japanese Application No. 2011-552061 dated Mar. 11, 2014, 6 pgs.

Reply Japanese Office Action cited in Japanese Application No. 2011-552061 dated Jun. 10, 2014, 1 pg.

Japanese Notice of Allowance cited in Japanese Application No. 2011-552061 dated Jul. 8, 2014, 4 pgs.

Smith, Russ, "HP's Slim Keyboard for the HP iPAQ", Published Date: Jun. 18, 2003, pp. 1-9. http://www.pocketnow.com/index.php?a=portal_detail&t=reviews&id=259.

"Bluetooth Frog Pad", 1999-2006 Frogpad, Inc., Published Date: Dec. 29, 2008, pp. 1-2. http://wwwfrogpad.com/information/bluefroginfo.asp.

"Folding Keyboard for Phones and PDAs", Reed Business Information, Date Published: Jun. 24, 2003, p. 1. http://www.ferret.com.au/c/Targus-Australia/Folding-keyboard-for-phones-and-PDAs-n692237.

Lee, Nicole, "Verizon Wireless goes official with the LG Versa", Date Published: Feb. 25, 2009 pp. 1-3. http://news.cnet.com/8301-17938_105-10172497-1.html?part=rss&tag=feed&subj=Crave.

International Search Report cited in related U.S. Appl. No. 12/394,852 Mailed Date: Dec. 7, 2010, Application No. PCT/US2010/023259, Filed Date: Feb. 5, 2010, pp. 9.

Response to Amendment cited in related U.S. Appl. No. 12/394,852 Dated: Jun. 28, 2012 pp. 1-4.

Amendment after Notice of Allowance cited in related U.S. Appl. No. 12/394,852 Dated: Jun. 19, 2012 pp. 1-12.

Notice of Allowance cited in related U.S. Appl. No. 12/394,852 Dated: Mar. 19, 2012 pp. 1-13.

Advisory Action cited in related U.S. Appl. No. 12/394,852 Dated: Dec. 21, 2011 pp. 1-3.

Amendment after Final Office Action cited in related U.S. Appl. No. 12/394,852 Dated: Dec. 14, 2011 pp. 1-12.

Final Office Action cited in related U.S. Appl. No. 12/394,852 Dated: Sep. 14, 2011 pp. 1-13.

Amendment after Non Final Office Action cited in related U.S. Appl. No. 12/394,852 Dated: Aug. 30, 2011 pp. 1-18.

(56) References Cited

OTHER PUBLICATIONS

Non Final Office Action cited in related U.S. Appl. No. 12/394,852 Dated: Jun. 1, 2011 pp. 1-32.
Petition to Preliminary Amendment cited in related U.S. Appl. No. 12/394,852 Dated: May 27, 2011 pp. 1-4.
Preliminary Amendment cited in related U.S. Appl. No. 12/394,852 Dated: Apr. 28, 2011 pp. 1-25.
First Office Action cited in related Chinese application No. 201080009733.1 Date:Jun. 11, 2012 pp. 1-8.
Response to First Office Action cited in related Chinese application No. 201080009733.1 Dated: Jul. 16, 2012 pp. 1-22.
Second Office Action cited in related application No. 201080009733.1 Dated: Aug. 27, 2012 pp. 1-10.
Reply Japanese Office Action cited in Japanese Application No. 2011-552061 dated Dec. 26, 2013, 11 pgs.
Chinese Office Action cited in Chinese Application No. 201310003712.4 dated Jul. 29, 2014, 15 pgs.
Response to 1st Chinese Office action dated Dec. 15, 2014, 16 pages.
Second Chinese Office action dated Jan. 5, 2015.
Korea Office Action, issued in related Korea Patent Application No. 10-2011-7019778 (w/English Translation), dated Dec. 15, 2015, 11 pages.
Japanese Office Action, issued in Japan Application No. 2014-180974 (w/English translation), dated Jun. 23, 2015, 12 pages.
Saito, "Why the Nintendo DS sells well—Gamenics changes the interface," Shuwa System Co., Ltd, Aug. 1, 2007, first edition, pp. 56-57 (In Japanese, no English version available).
Office Action received in counterpart Canadian Patent Application No. 2749676, mailed Feb. 23, 2016, 4 pages.
Office Action (w/ English Translation) received in Japanese Patent Application No. 2014-180974, Mar. 22, 2016, 4 pages.
"User's Guide diNovo Mini Keyboard," retrieved from: http://download01.logitech.com/web/ftp/pub/pdf/keyboards/diNovo_productguide_eng-fre.pdf, Jan. 5, 2008, 42 pages.
"User Guide Palm® Wireless Keyboard with Bluetooth® Wireless Technology," retrieved from: http://www.hpwebos.com/us/support/handboods/btwk_ug_en.pdf, 2006, 40 pages.
"ThinkOutside Stowaway Universal BluetoothKeyobard Review," retrieved from: https://youtube.com/watch?v=awJyCPtlNOI, Dec. 28, 2004, 2 pages.
Japanese Notice of Allowance with translated allowed claims received in Japanese Application No. 2011-552061, dated Jul. 8, 2014, 4 pages.
Notice of Allowance with translated allowed claims received in Japanese counterpart application No. 2014-180974, Jul. 12, 2016, 7 pages.
Office Action received in counterpart Canadian Patent Application No. 2,749,676, Sep. 20, 2016, 5 pages.
Office Action (w/English Translation) received in a counterpart Korean Patent Application No. 10-2016-7026503, Dec. 14, 2016, 13 pages.

* cited by examiner

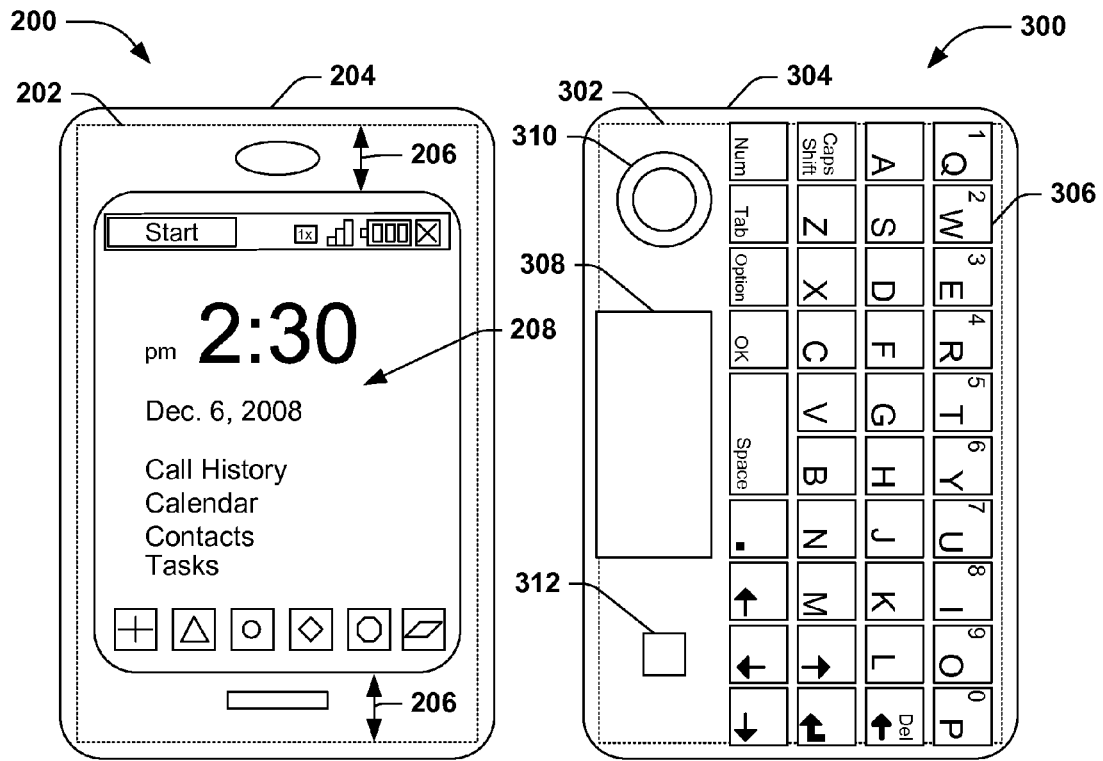
FIG. 2    FIG. 3
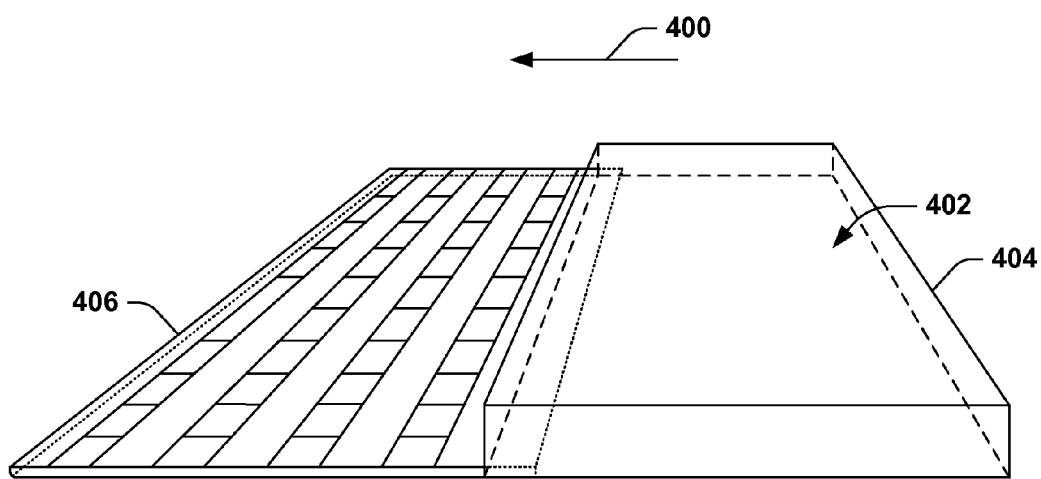
FIG. 4

PROTECTIVE SHROUD FOR HANDHELD DEVICE

RELATED APPLICATION

This application is a continuation of U.S. patent application Ser. No. 12/394,852, filed on Feb. 27, 2009, entitled "Protective Shroud for Handheld Device", at least some of which is incorporated herein by reference.

BACKGROUND

Touch screen devices, and in particular touch screen cell phones, have grown in popularity over the past few years because they enable a user to interact directly with content displayed on the display, rather than through an intermediary, such as a hardware QWERTY keyboard. Touch screen devices generally comprise software keys (e.g., icons displayed on the display) and touch sensors, integrated into the display, that detect the presence and location of a user's touch within the display. Software correlates the location of the touch to an icon displayed in the vicinity of the touch to determine what a user intended to select.

Several manufacturers of touch screen devices have opted to eliminate or substantially reduce the number of hardware keys integrated into touch screen devices. Instead, manufacturers create software keys that may be selectively displayed on the screen (e.g., when user input is desired). There are several advantages to reducing the number of hardware keys, particularly for manufacturers of cell phones and other small handheld devices. For example, manufacturers may be able to offer devices that are more sleek (e.g., relative to bulkier devices that may have a full, hardware QWERTY keyboard) and/or have a larger screen (e.g., because available space is not consumed by hardware keys). Manufacturers may also reduce the cost of producing the device because less hardware components are needed. Additionally, consumers may benefit because the cost of the device may be cheaper and the software keys may offer more flexibility with regards to key arrangement (e.g., users may switch between a numerical keyboard, a full QWERTY keyboard, a compact QWERTY, and since they generally comprise icons on a touch sensitive screen, software keys may be added, subtracted, resized, rearranged, reconfigured with different functionality, etc.) than hardware keys. Also, there may be fewer software key failures relative to hardware key failures (e.g., buttons becoming corroded and/or stuck), thus prolonging the useful life of the device.

While there are numerous benefits to software keys, there are also several disadvantages that have discouraged some consumers from purchasing touch screen devices that predominately rely on software keys for user input. For example, the development of software keys lags behind hardware keys. Therefore, touch screen devices still have some difficulty in determining the precise location of the user's touch on the display (e.g., causing a key other than the user's intended key to be selected). Additionally users that use the device primarily for text messaging and/or email, such as enterprise users, tend to prefer hardware keys that provide haptic feedback over software keys that do not provide a sense of touch. Some users also prefer hardware keys because software keys take up valuable display space that could display other content, such as a larger portion of an email the user is typing, for example. Therefore, the potential markets for touch screen devices that utilize software keys may be limited.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein, a protective shroud may be configured to enclose a portion of a handheld device. In this way, the protective shroud may provide protection to the handheld device against incidents (e.g., drops, scratches, etc.) that commonly cause damage to the device. The protective shroud may be selectively removed from the handheld device when a user does not want the protective shroud to enclose the handheld device, for example.

An input component (e.g., keyboard, mouse, etc.), integral with the protective shroud (e.g., physically attached or embedded), may be configured to receive user input from which a signal is generated and transmitted from the protective shroud to the handheld device through a wireless transceiver and/or an electrically operable contact point connecting the input component to the handheld device.

A wireless transceiver, integral with the protective shroud, may be configured to transmit a signal from the one or more components integral to the protective shroud (e.g., the input component, a sound transceiver, a storage device, etc.) to the handheld device. Similarly, the wireless transceiver allows signals (e.g., from the handheld device) to be received by the protective shroud. In this way, effective communication can be maintained between the handheld device and the protective shroud when the protective shroud is removed or otherwise physically decoupled from the handheld device.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 2 is an exemplary illustration of a front-face of a handheld device partially enclosed by a protective shroud.

FIG. 3 is an exemplary illustration of a back-face of a handheld device partially enclosed by a protective shroud, wherein an input component is integral to the protective shroud.

FIG. 4 is an exemplary illustration of a protective shroud, wherein an input component is configured to slide out of the protective shroud.

DETAILED DESCRIPTION

Figure 1:
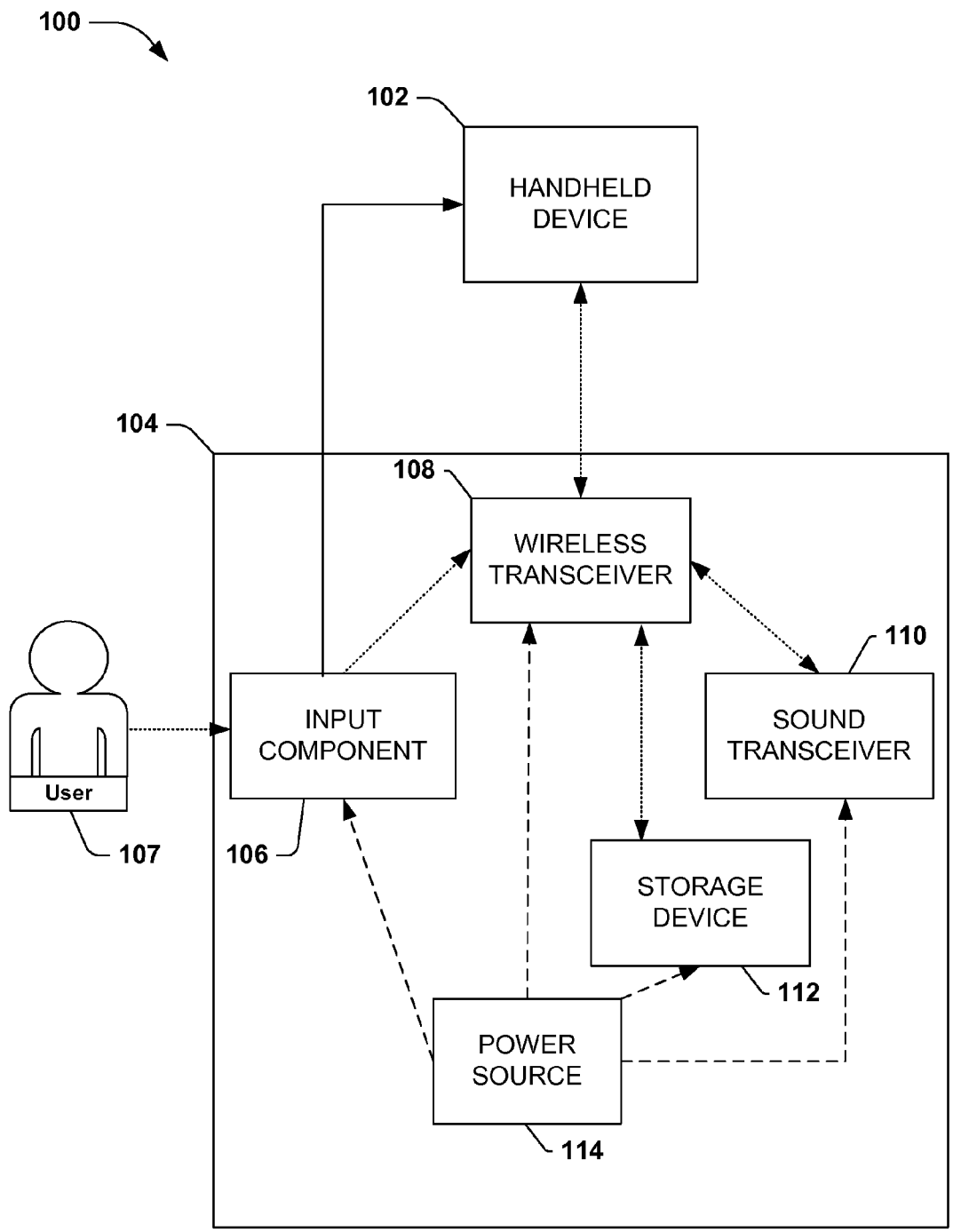
FIG. 1 is a component block diagram illustrating an exemplary system for communicating with a handheld device.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

FIG. 1 illustrates a component block diagram of an exemplary system 100 for communicating with a handheld device 102. The handheld device 102 may comprise a cellular phone, personal digital assistant (PDA), or other lightweight device generally capable of being operated while being held in a user's hand. In one embodiment, the handheld device 102 comprises a touch screen cellular telephone that utilizes one or more touch sensors (e.g., capacitive sensors or resistive sensors) capable of detecting human interaction with a screen. For example, a user may touch an icon displayed on the screen of the handheld device 102 (e.g., a software key) to insert a letter into a text message the user is composing on the device 102.

The system 100 also comprises a protective shroud 104. The protective shroud 104 is configured to enclose at least a portion of the handheld device 102, when it is attached or otherwise physically coupled to the device 102. In this way, the protective shroud 104 is configured to provide protection for the device 102 from incidents (e.g., drops, scratches, liquids, etc.) that may ordinarily cause damage to the handheld device 102 if the device 102 is otherwise not protected. It will be appreciated that the percentage of surface area of the handheld device 102 that is enclosed by the protective shroud 104 may vary to allow a user to interact with the device 102. For example, a display screen of the device 102 may not be enclosed by the protective shroud 104 so the user can interact directly with the display screen, such as might occur on a touch screen cellular telephone, for example.

The appearance of the protective shroud 104 (e.g. the material used, the color of the protective shroud 104, etc.) may be a function of utility and/or aesthetic appeal. In one embodiment, the material (e.g., leather, plastic, acrylic, silicone, etc.) of the protective shroud 104 may depend upon the type(s) of incidents the protective shroud 104 is designed to protect against. For example, a protective shroud configured to protect the handheld device 102 from a ten foot fall may comprise a high-impact plastic material, whereas a protective shroud configured to protect the handheld device 102 from rubbing against coins (e.g., preventing scratches), when the device 102 is stored in a user's pocket, may comprise silicone. Consumer demand may also dictate the appearance of the protective shroud. For example, consumer's may prefer a black leather protective shroud because it looks more professional, or consumer's may prefer a silicone protective shroud because the protective shroud may be very thin. In this way, protective shroud's having a plurality of different appearances may be produced (e.g., allowing the protective shroud 104 to be more personalized to a user's interests relative to a protective shroud that is only available in one design).

The protective shroud 104 is also configured to be selectively removable from the handheld device 102. That is, the protective shroud 104 is configured so that is may be physically detached from the handheld device 102. It will be appreciated that the protective shroud 104 may not offer protection to the handheld device 102 when the protective shroud 104 is not physically attached to the handheld device 102. The means by which the protective shroud 104 is attached and/or detached to the device 102 may vary depending upon the composition of the protective shroud 104 (e.g., the material used), the incidents that shroud 104 is intended to offer protection against, the type of handheld device 102 the protective shroud 104 is configured to enclose, etc. For example, the protective shroud 104 may be configured to stretch so that the handheld device 102 may slip into and out of the protective shroud 104. In another example, the protective shroud 104 comprises a hook and latch mechanism, wherein the protective shroud 104 opens when that latching mechanism is unlatched, so that the device 102 may be put into and taken out of the shroud 104.

An input component 106 may be integral with (e.g., embedded in or physically attached to a surface of) the protective shroud 104. In this way, the input component 106 may remain physically attached to the protective shroud 104 when the protective shroud 104 is detached from the handheld device 102. That is, the input component 106 may not be in close physical proximity to (e.g., physically touching) the handheld device 102 except when the handheld device 102 is enclosed in the protective shroud 104.

The input component 106 is configured to receive user input from a user 107. The input component 106 may comprise an alphanumeric keypad (e.g., a full QWERTY keypad, compact QWERTY keypad, numerical keypad, etc.), a touch sensitive surface (e.g., a touchpad, a handwriting input component, etc), a game controller, and/or other input mechanism, and the input may be received when the user 107 touches a particular location or key on the input mechanism, for example.

The input component 106 may also be configured to generate an input signal based upon the received user input. This signal may be transmitted to the handheld device 102, wherein the handheld device 102 translates the input signal into a usable format (e.g., assisting the handheld device 102 in generating a user specified text message or email, to initialize a program, etc.). In one embodiment, the input signal is transmitted to the handheld device 102 through an electrically operable contact point, such as a mini-USB cable or other transmission cable, that operably connects the input component 106 to the handheld device 102. In another embodiment, the input signal generated by the input component 106 is transmitted to the handheld device 102 wirelessly (e.g., where both the protective shroud 104 and the handheld device 102 comprise transceivers capable of sending and receiving signals through a wireless protocol).

The input component 106 may comprise one or more user programmable portions. That is, the user 107 may designate a function that may be executed when a particular portion of the input component 106 is touched and/or selected (e.g., where the designation is stored by the input component 106 and/or a portion of the handheld device 102 that translates the signal into a usable format). For example, the user 107 may designate that a "Return" key on the input component 106 activates a recording mechanism on the handheld device 102 when it is selected (e.g., so that the user 107 can record an address that is being spoken to him/her during a phone conversation). In this way, portions of the input component 106 may be personalized based upon the user's preferences.

In one embodiment, the input component 106 comprises one or more touch sensors (e.g., embedded into the input component 106). The touch sensor(s) may be similar to touch sensors used in a touch screen device (e.g., resistive, capacitive, etc.). In this way, the input component 106 may comprise a solid surface, for example, so that debris and/or dust particles are unable to get behind keys. Additionally, the input component 106 may have an uneven or non-uniform surface (e.g., with brail and/or a raised border surrounding each key) so that the user 107 can differentiate between keys.

In another embodiment, the input component 106 comprises one or more mechanical keys. It will be appreciated that the terms "mechanical keys" is used herein in a broad sense to describe keys that are selected when a user physically presses down on the keys. Generally, mechanical keys comprise a spring, or other mechanism, that causes a selected key to return to its position prior to being selected by the user 107.

It will be appreciated that the input component 106 may comprise a material similar to the protective shroud 104 and/or it may be comprised of a different material. For example, where the protective shroud 104 is comprised of a material that may also be used for mechanical keys (e.g., silicon, polyester film, hard plastic, etc.) the input component 106 and the protective shroud 104 may comprise similar materials. However, where the protective shroud 104 comprises leather, for example, the input component 106 may comprise a different material because it may be difficult to make mechanical keys that are both small and leather bound and/or it may be difficult to embed touch sensors in leather, for example.

A wireless transceiver 108 may be integral with (e.g., embedded in or physically attached to) the protective shroud 104. The wireless transceiver 108 is configured to facilitate selective wireless communications with the handheld device 102 (e.g., wherein the handheld device 102 comprises a wireless transceiver). That is, the wireless transceiver 108 may be configured to send signals to the handheld device 102 and/or receive signals from the handheld device 102. For example, the wireless transceiver 108 may be configured to receive input signals from the input component 106 and transmit the received signals to the handheld device 102. In one example, the wireless transceiver 108 communicates with the handheld device 102 through IEEE Standard 802.15.1 protocol (e.g., Bluetooth®). However, it will be appreciated that other protocols, such as IEEE Standard 802.11, for example, are also contemplated.

It will be appreciated that other components may also be integral to the protective shroud. For example, a sound transceiver 110 may be integral to the protective shroud 104. The sound transceiver 110 may comprise a microphone configured to detect sound waves (e.g., emitted by the user 107) and generate detection signals. The sound transceiver 110 may then transmit the detection signals to the handheld device 102 through the wireless transceiver 108 and/or a contact point (e.g., a mini-USB or other transmission cable) configured to operably couple the sound transceiver 110 to the handheld device 102. The sound transceiver 110 may additionally or instead of, comprise a speaker configured to receive emission signals from the handheld device 102, through the wireless transceiver 108 and/or an electrically operable contract point, and emit sound waves. In another example, a storage device 112 (e.g., a flash drive) configured to store data may be integral to the protective shroud 104. The storage device 112 may be operably coupled to the handheld device 102 through the wireless transceiver 108 and/or a contact point. In this way, the storage device 112 may provide storage capacity for the handheld device 102 (e.g., a cellular telephone), for example. In yet another example, a computer processing unit (CPU) may be integral to the protective shroud 104. The CPU may be operably coupled to the handheld device 102 through a contact point, for example, that may be configured to perform operations that are unable to be performed by the handheld device 102, for example (e.g., the CPU additive with a handheld device's capabilities).

It will be understood to those skilled in the art that the wireless transceiver 108 may provide a mechanism to operably couple components integral to the protective shroud 104 (e.g., the sound transceiver 110, input component 106, etc.) with devices other than the handheld device 102 when the components are not operably coupled to the handheld device 102. For example, if a television is capable of receiving and/or sending signals wirelessly, the wireless transceiver 108 may be operably coupled to the television, and the input component 106 may be used as remote control.

A power source 114 may be configured to supply power to the input component 106, the wireless transceiver 108, and/or other components integral to the protective shroud 104. In the exemplary system 100, the power source 114 (e.g., a battery) is integral to the protective shroud 104. That is, the power source is embedded in and/or physically attached to the protective shroud 104. In this way, the power source 114 may continue to supply power to the input component 106, the wireless transceiver 108 and/or other components integral to the protective shroud 104 when the protective shroud 104 is not physically attached to the handheld device 102.

It will be appreciated that if the power source 114 is integral to the protective shroud 104, the power source 114 may also be configured to supply power to the handheld device 102 through an electrically operable contact point (e.g., a mini-USB cable or other power transmission conduit) configured to operably couple the power source 114 to the handheld device 102. For example, a battery embedded in the protective shroud 104 may serve as a backup battery for a cellular telephone if the main battery for the cellular telephone (e.g., integral to the handheld device) is not charged.

In another embodiment, the power source 114 is integral to the handheld device 102. That is, the main battery for a cellular phone, for example, may supply power to the input component 106, the wireless transceiver 108, and/or other components integral to the protective shroud 104 through a contact point operably coupling the power source 114 to one or more components integral to the protective shroud that consumer power.

It will be understood to those skilled in the art that other components commonly placed on protective shrouds for handheld devices may also be physical attached to the protective shroud 104 herein described. For example, the protective shroud 104 may comprise a belt clip and/or a wrist strap. In another example, the protective shroud 104 comprises a stand configured to support the handheld device 102 in a vertical position.

FIG. 2 illustrates a front view 200 of a handheld device 202 (e.g., 102 in FIG. 1) having a protective shroud 204 (e.g., 104 in FIG. 1) partially formed therearound. In the illustrated example, a portion 206 of the front-face of the handheld device 202 is enclosed by the shroud 204, whereas a display portion 208 of the handheld device 202 remains substantially un-obscured by the shroud 204. In this way, the protective shroud 204 is configured to provide some protection against incidents (e.g., drops, scratches, spills, etc.) that may damage the handheld device 202, while still allowing a user access to the display portion 208.

FIG. 3 illustrates a back or rear view 300 of a handheld device 302 (e.g., 202 in FIG. 2), wherein the back-face of the device 302 is positioned on a substantially diametrically opposing side of the handheld device 302 from a display (e.g., 208 in FIG. 2). In the illustrated example, a protective shroud 304 (e.g., 204 in FIG. 2) encloses the back-face of the handheld device 302 (e.g., the back-side or back-face of the handheld device 302 is covered up by the protective shroud 304).

An input component (e.g., 106 in FIG. 1), comprising an alphanumeric keypad 306 and a touch sensitive surface 308, is integral with the protective shroud 304. That is, the input component faces outward so that user input may be received while the protective shroud 304 is enclosing the handheld device 302. For example, if a user wants to type a text message on his/her cellular telephone, the user may rotate the phone 180° (e.g., so that backside of the phone is facing the user), type the message using the alphanumeric keypad 306, and rotate the phone back 180° to view the message on the display (e.g., 208 in FIG. 2). It will be appreciated that other components, such as a speaker 310 and/or a microphone 312, may be integral with the protective shroud 304. These component may also be located on a portion of the protective shroud 304 positioned near the back-face 300 of a handheld device 302.

FIG. 4 illustrates an input component 406 (e.g., 106 in FIG. 1) integral with a protective shroud 404 (e.g., 104 in FIG. 1). The input component is configured to slide out (e.g., leftward 400) from the protective shroud 404. That is, the protective shroud 404 is configured to enclose a handheld device (e.g., 102 in FIG. 1) situated inside 402 a portion of the protective shroud 404, and the input component 406 is configured to slide out of a portion of the protective shroud 404 (e.g., located nearer a back-face of a handheld device). It will be appreciated that a configuration similar to that illustrated in FIG. 4 is commonly found on cellular telephones that have full QWERTY keyboards. However, unlike those found on cellular telephones, where the keyboard is physically connected to the cellular telephone, the input component 406 is sliding out of the protective shroud 404. In this way, the input component 406 may serve a purpose similar to that of a keyboard attached to a cellular telephone, but the input component 406 may be removable from the cellular telephone or other handheld device by detaching the protective sleeve 404 from the handheld device.

Figure 5:
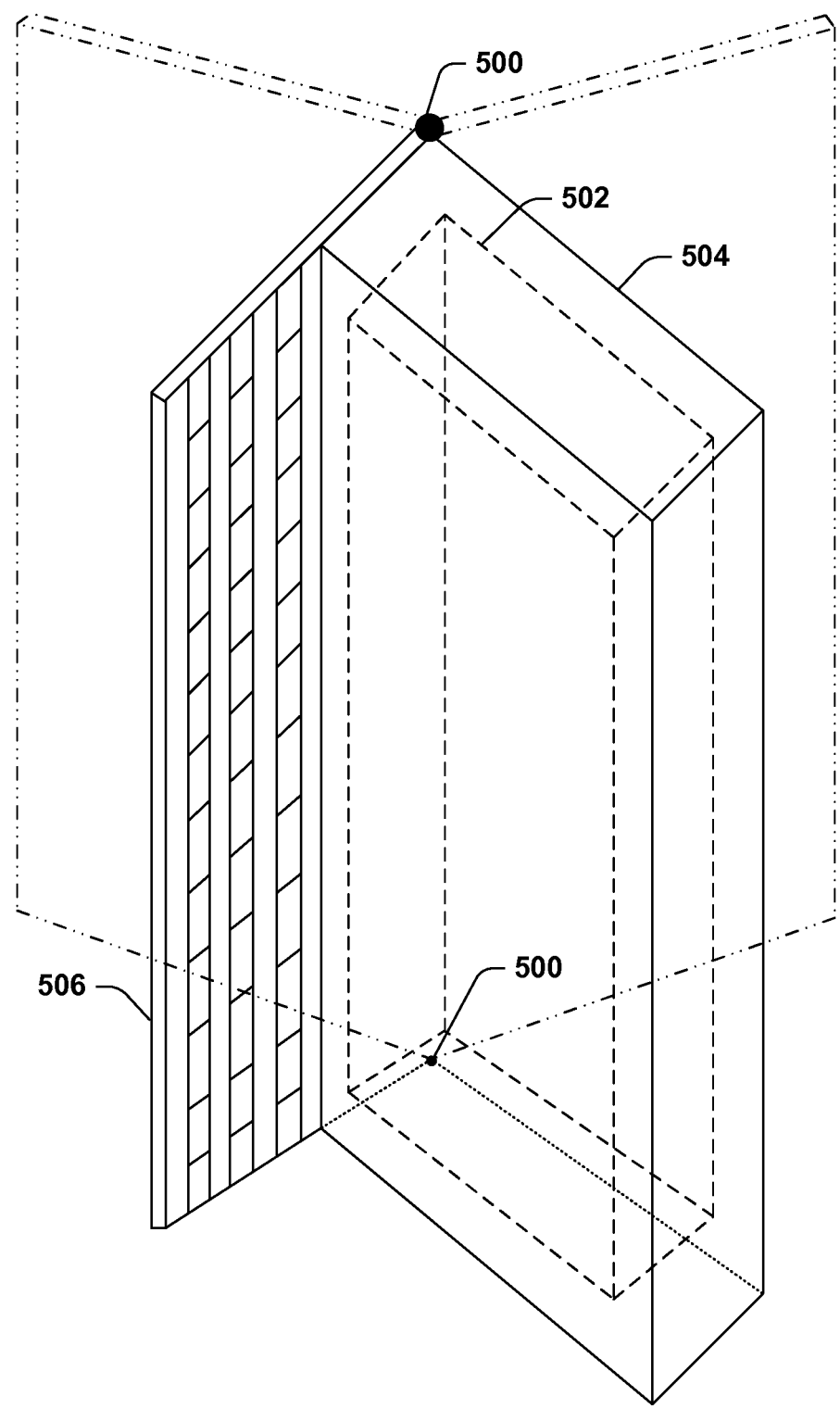
FIG. 5 is an exemplary illustration of a protective shroud, wherein an input component is configured to pivot about a portion of the protective shroud.

FIG. 5 illustrates an input component 506 (e.g., 106 in FIG. 1) integral with a protective shroud 504 (e.g., 104 in FIG. 1). The input component is configured to rotate (e.g., counterclockwise) about a hinge 500 on the protective shroud 504 enclosing a handheld device 502. In one example, the input component 506 is configured to be latched to the protective shroud 504 (e.g. nearer a back-face of the handheld device 502) when the input component 506 is not being used. When a user desires to use the input component 506, the latch may be detached and the input component 506 may be rotated about the hinge 500 (e.g., counterclockwise) until the input component 506 is perpendicular to a side-face of the handheld device 502, for example. In this way, a user may view one or more keys comprised on the input component 506, for example, at the same time as he/she is viewing a display portion of the handheld device 502.

Figure 6:
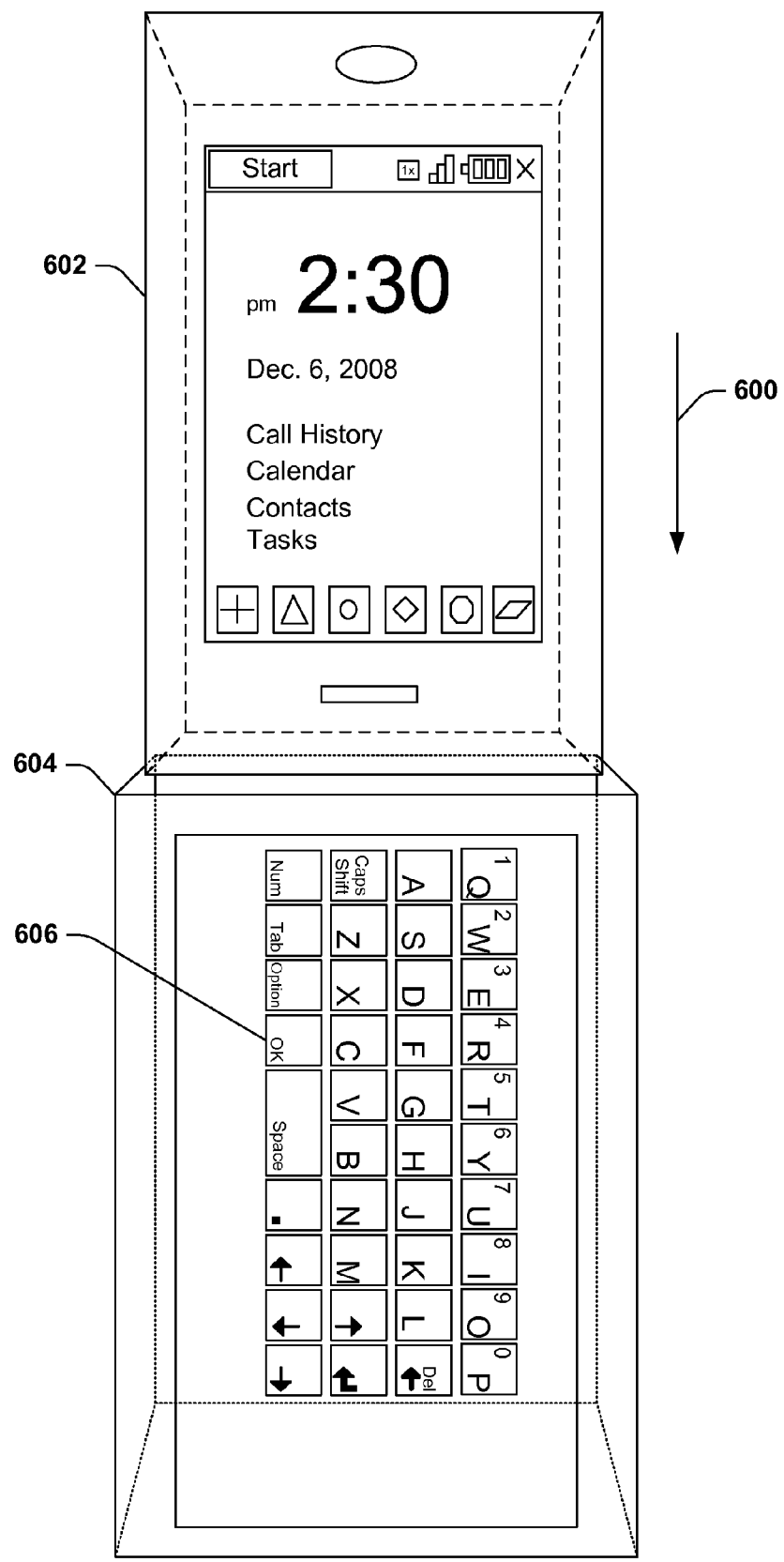
FIG. 6 is an exemplary illustration of a protective shroud, wherein an input component is integral to an interior wall of the protective shroud.

FIG. 6 illustrates an input component 606 (e.g., 106 in FIG. 1) integral with a protective shroud 604 (e.g., 104 in FIG. 1). In the illustrated example, the input component 606 is positioned on an interior wall (e.g., a wall that makes physical contact with a handheld device) of the protective shroud 604. A handheld device 602 (e.g., 102 in FIG. 1) is configured to slide (e.g., downward 600) into the protective shroud 604. In this way, the input component 606 may be covered by the back-face of the handheld device 602 when the handheld device 602 is enclosed in the protective shroud 604. This may protect keys of the input component 606 from being bumped while the handheld device 602, enclosed in the protective shroud 604, is stored in a user's pocket, for example. It will be appreciated that in the illustrated example, a user may have to remove (e.g., slide up) the handheld device 602 from the protective shroud 604 before the user can use the input component 606.

It will be appreciated that FIGS. 3-6 illustrates several example configurations for having an input component that is integral to a protective shroud. However, other configurations are also contemplated. For example, the input component may be integral to a plurality of different surfaces of the protective shroud, and the plurality of surfaces may be connected together through a series of hinges. When the protective shroud is detached from a handheld device, the plurality of surfaces of the protective shroud may be configured to lay flat (e.g., forming a full sized keypad).

Various operations of embodiments are provided herein. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. An apparatus for a handheld device, comprising:
   a protective shroud selectively attachable to the handheld device and configured to protect at least a display portion of the handheld device when attached to the handheld device;
   one or more electrical contacts integral with the protective shroud and configured to contact one or more electrical contacts of the handheld device when the protective shroud is attached to the handheld device; and
   an input component integral with the protective shroud and configured to generate an input signal based upon received user input and further configured to transmit the input signal to the handheld device through the one or more electrical contacts, the input component comprising an alphanumeric keypad and a touchpad adjacent to the alphanumeric keypad, the input component positioned on an interior wall of the protective shroud and configured to make physical contact with the handheld device.

2. The apparatus of claim 1, where the alphanumeric keypad further comprises a plurality of mechanical keys.

3. The apparatus of claim 1, where the alphanumeric keypad further comprises a plurality of touch sensors.

4. The apparatus of claim 3, where the input component includes a non-uniform surface that differentiates at least some of the plurality of touch sensors as keys of the alphanumeric keypad.

5. The apparatus of claim 3, where the input component is configured to provide haptic feedback when a user contacts at least one key of the alphanumeric keypad.

6. The apparatus of claim 1, further including a power source integral to the protective shroud.

7. The apparatus of claim 6, where the power source is configured to supply power to the handheld device through the one or more electrical contacts.

8. The apparatus of claim 1, where the protective shroud includes a hinge configured to allow the input component to be rotated with respect to the handheld device.

9. The apparatus of claim 8, where the hinge is further configured to permit the input component to be rotated to a substantially perpendicular position with respect to the handheld device.

10. The apparatus of claim 8, where the hinge is further configured to permit the input component to be rotated to a position near a back-face of the handheld device when the input component is not in use.

11. The apparatus of claim 1, where the input component further comprises at least one of a keyboard, a game controller, or a handwriting input component.

12. An apparatus for a handheld device, comprising:
    a protective shroud selectively attachable to the handheld device and configured to cover at least a portion of the handheld device when attached to the handheld device;
    an alphanumeric keypad integral with the protective shroud;
    a power source integral to the protective shroud; and
    one or more electrical contacts integral with the protective shroud and configured to contact one or more electrical contacts of the handheld device when the protective shroud is attached to the handheld device and configured to provide for a transfer of information between the handheld device and the alphanumeric keypad, wherein the one or more electrical contacts integral with the protective shroud are configured to couple the power source to the handheld device, and the power source serves as a backup battery for the handheld device; and
    at least one of:
    a speaker integral with the protective shroud and configured to emit sound waves in response to receiving sound data from the handheld device through the one or more electrical contacts; or
    a microphone integral with the protective shroud and configured to detect sound waves and generate sound data for transmission to the handheld device through the one or more electrical contacts.

13. The apparatus of claim 12, further including a hinge integral with the protective shroud and configured to rotate a portion of the protective shroud to which at least one of the alphanumeric keypad, the speaker, or the microphone is integrated relative to the handheld device.

14. The apparatus of claim 12, where the protective shroud includes a substantially solid surface, the substantially solid surface including a plurality of touch sensors that comprise keys of the alphanumeric keypad.

15. The apparatus of claim 14, where the substantially solid surface further comprises a non-uniform surface that differentiates the keys of the alphanumeric keypad.

16. An apparatus for a handheld device, comprising:
    a protective shroud selectively attachable to the handheld device and configured to protect at least a portion of the handheld device when attached to the handheld device;
    an alphanumeric keypad positioned on a face of the protective shroud, wherein the alphanumeric keypad is embedded within the protective shroud;
    a touchpad positioned on the face of the protective shroud, wherein the touchpad is integral with the protective shroud, separate from the alphanumeric keypad, and adjacent to the alphanumeric keypad;
    a processing unit integral with the protective shroud;
    one or more electrical contacts integral with the protective shroud and configured to contact one or more electrical contacts of the handheld device when the protective shroud is attached to the handheld device and configured to provide for a transfer of at least one of power or information between the handheld device and the alphanumeric keypad and between the handheld device and the processing unit; and
    a hinge integral with the protective shroud and configured to rotate a portion of the protective shroud to which at least one of the alphanumeric keypad or the processing unit is integrated relative to the handheld device.

17. The apparatus of claim 16, where the alphanumeric keypad further comprises a plurality of mechanical keys.

18. The apparatus of claim 16, where the alphanumeric keypad further comprises a plurality of touch sensors.

19. The apparatus of claim 18, where the protective shroud includes a non-uniform surface that differentiates at least some of the plurality of touch sensors as keys of the alphanumeric keypad.

20. The apparatus of claim 18, where the alphanumeric keypad is configured to provide haptic feedback when a user contacts at least one key of the alphanumeric keypad.

21. The apparatus of claim 16, where the hinge is further configured to permit an input component to be rotated to a substantially perpendicular position with respect to the handheld device.

22. The apparatus of claim 16, where the hinge is further configured to permit an input component to be rotated to a position near a back-face of the handheld device when the input component is not in use.

\* \* \* \* \*